(12) United States Patent
Uhlhorn et al.

(10) Patent No.: US 7,792,427 B1
(45) Date of Patent: Sep. 7, 2010

(54) OPTICAL CODE DIVISION MULTIPLE ACCESS DATA STORAGE AND RETRIEVAL

(75) Inventors: Brian L. Uhlhorn, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1092 days.

(21) Appl. No.: 11/343,094

(22) Filed: Jan. 30, 2006

(51) Int. Cl.
*H04J 4/00* (2006.01)
*H04B 10/06* (2006.01)

(52) U.S. Cl. .......................... 398/77; 398/78; 398/140; 398/183; 398/202; 398/212

(58) Field of Classification Search .................... 398/77, 398/78, 79, 89, 140
See application file for complete search history.

(56) References Cited

U.S. PATENT DOCUMENTS

| | | | |
|---|---|---|---|
| 4,506,387 A | 3/1985 | Walter | |
| 4,723,310 A | 2/1988 | De Corlieu et al. | |
| 4,779,266 A | 10/1988 | Chung et al. | |
| 5,327,276 A | 7/1994 | Shimosaka et al. | |
| 5,404,240 A | 4/1995 | Nishio et al. | |
| 5,424,543 A | 6/1995 | Dombrowski et al. | |
| 5,450,224 A | 9/1995 | Johansson | |
| 5,594,577 A | 1/1997 | Majima et al. | |
| 5,686,722 A | 11/1997 | Dubois et al. | |
| 5,793,907 A | 8/1998 | Jalali et al. | |
| 5,838,437 A | 11/1998 | Miller et al. | |
| 6,014,237 A | 1/2000 | Abeles et al. | |
| 6,025,944 A | 2/2000 | Mendez et al. | |
| 6,038,357 A | 3/2000 | Pan | |
| 6,292,282 B1 | 9/2001 | Mossberg et al. | |
| 6,388,782 B1 | 5/2002 | Stephens et al. | |
| 6,486,984 B1 | 11/2002 | Baney et al. | |
| 6,594,050 B2 | 7/2003 | Jannson et al. | |
| 6,614,950 B2 | 9/2003 | Huang et al. | |
| 6,690,853 B1 | 2/2004 | Alaimo et al. | |
| 6,728,445 B2 | 4/2004 | Blomquist et al. | |
| 6,748,083 B2 | 6/2004 | Hughes et al. | |

(Continued)

OTHER PUBLICATIONS

Kwong, et al. Design of Multilength Optical Orthogonal Codes for Optical CDMA Multimedia Networks. IEEE Transactions on Communications. Aug. 2002. vol. 50. No. 8. pp. 1258-1265.

*Primary Examiner*—Li Liu
(74) *Attorney, Agent, or Firm*—Marsh Fischmann & Breyfogle LLP

(57) ABSTRACT

An OCDMA system is disclosed that provides for storage and retrieval of OCDMA data while maintaining OCDMA encoding and signaling information. The system includes a wavelength demultiplexer that optically receives an OCDMA signal having a plurality of wavelengths of light. A plurality of light detectors is optically interconnected with the wavelength demultiplexer, with each of the light detectors being associated with a unique wavelength of light. Each of the light detectors respectively communicates with a plurality of storage volumes. For example, each storage volume is associated with a unique wavelength of light and is configured for storing optical data electronically converted from an optical data stream having a unique wavelength of light. Such a process may substantially eliminate the need for OCDMA conversion during electronic storage of the OCDMA data. Stored OCDMA data may be rapidly retrieved and configured as an OCDMA signal because OCDMA coding is maintained.

14 Claims, 3 Drawing Sheets

U.S. PATENT DOCUMENTS

| | | | |
|---|---|---|---|
| 6,778,102 B1 | 8/2004 | Grunnet-Jepsen et al. | |
| 6,904,239 B2 | 6/2005 | Chow et al. | |
| 6,915,077 B2 | 7/2005 | Lo | |
| 7,035,544 B1 | 4/2006 | Won | |
| 7,063,260 B2 | 6/2006 | Mossberg et al. | |
| 7,110,671 B1 | 9/2006 | Islam | |
| 7,113,703 B2 * | 9/2006 | Murata | 398/79 |
| 7,200,331 B2 | 4/2007 | Roorda et al. | |
| 7,200,342 B2 * | 4/2007 | Dafesh | 398/182 |
| 7,239,772 B2 | 7/2007 | Wang et al. | |
| 7,260,655 B1 | 8/2007 | Islam | |
| 7,308,197 B1 | 12/2007 | Zhong et al. | |
| 7,317,698 B2 | 1/2008 | Jagger et al. | |
| 7,324,753 B2 | 1/2008 | Kashima et al. | |
| 7,330,660 B2 | 2/2008 | Duelk | |
| 7,340,187 B2 * | 3/2008 | Takeshita | 398/209 |
| 7,341,189 B2 | 3/2008 | Mossberg et al. | |
| 7,366,426 B2 | 4/2008 | Kai et al. | |
| 7,369,765 B2 | 5/2008 | Aoki et al. | |
| 7,406,262 B2 | 7/2008 | Nakagawa et al. | |
| 7,415,212 B2 | 8/2008 | Matsushita et al. | |
| 7,418,209 B2 | 8/2008 | Salamon et al. | |
| 7,418,212 B1 | 8/2008 | Bontu | |
| 7,433,600 B2 | 10/2008 | Katagiri et al. | |
| 7,437,080 B2 | 10/2008 | Schmidt et al. | |
| 7,450,239 B2 | 11/2008 | Uehara et al. | |
| 7,474,854 B2 | 1/2009 | Sekiya et al. | |
| 7,499,652 B2 | 3/2009 | Zhong et al. | |
| 7,505,687 B2 | 3/2009 | Jaggi et al. | |
| 2002/0030868 A1 | 3/2002 | Salomaa | |
| 2002/0067523 A1 | 6/2002 | Way | |
| 2002/0067883 A1 | 6/2002 | Lo | |
| 2002/0196541 A1 | 12/2002 | Cai | |
| 2003/0123789 A1 | 7/2003 | Miyata et al. | |
| 2003/0152393 A1 | 8/2003 | Khoury | |
| 2003/0223687 A1 | 12/2003 | Blomquist et al. | |
| 2004/0141499 A1 | 7/2004 | Kashima et al. | |
| 2004/0184809 A1 | 9/2004 | Miyata et al. | |
| 2004/0197099 A1 | 10/2004 | Kai et al. | |
| 2005/0019034 A1 | 1/2005 | Aoki et al. | |
| 2005/0111376 A1 | 5/2005 | Raghothaman et al. | |
| 2005/0147414 A1 | 7/2005 | Morrow et al. | |
| 2005/0219543 A1 | 10/2005 | Uehara et al. | |
| 2005/0281558 A1 | 12/2005 | Wang et al. | |
| 2006/0098983 A1 | 5/2006 | Han et al. | |
| 2006/0115210 A1 | 6/2006 | Nakagawa | |
| 2006/0171719 A1 | 8/2006 | Schmidt et al. | |
| 2006/0209739 A1 | 9/2006 | Kumar et al. | |
| 2006/0210083 A1 | 9/2006 | Takemoto et al. | |
| 2006/0257143 A1 | 11/2006 | Cavazzoni et al. | |
| 2007/0036553 A1 * | 2/2007 | Etemad et al. | 398/140 |
| 2007/0110442 A1 * | 5/2007 | Peer | 398/78 |
| 2008/0002974 A1 | 1/2008 | Zhong et al. | |
| 2009/0016726 A1 | 1/2009 | Suzuki et al. | |

* cited by examiner

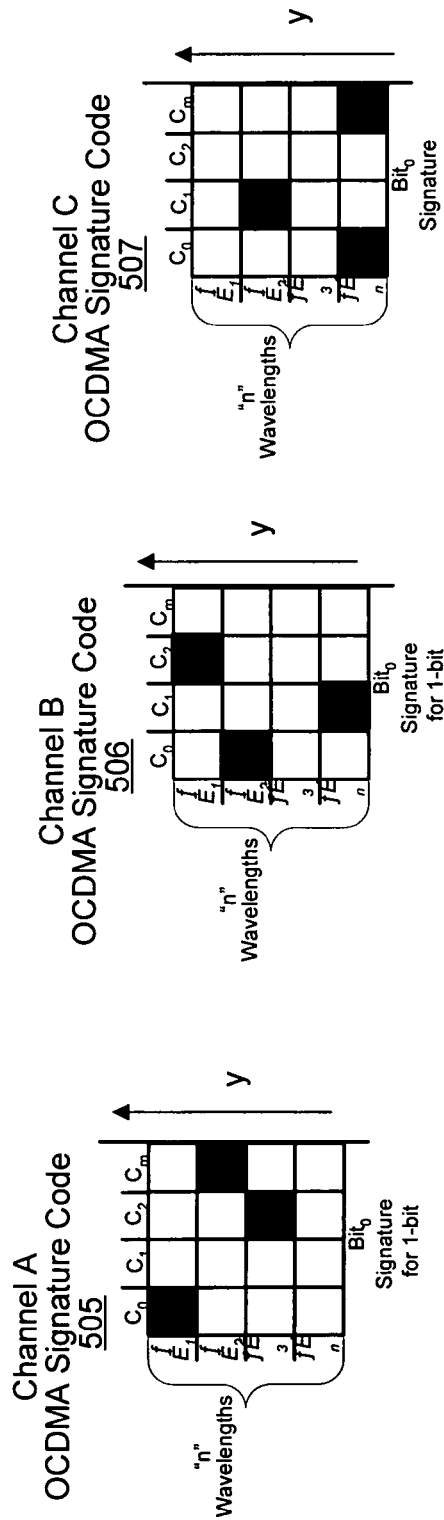
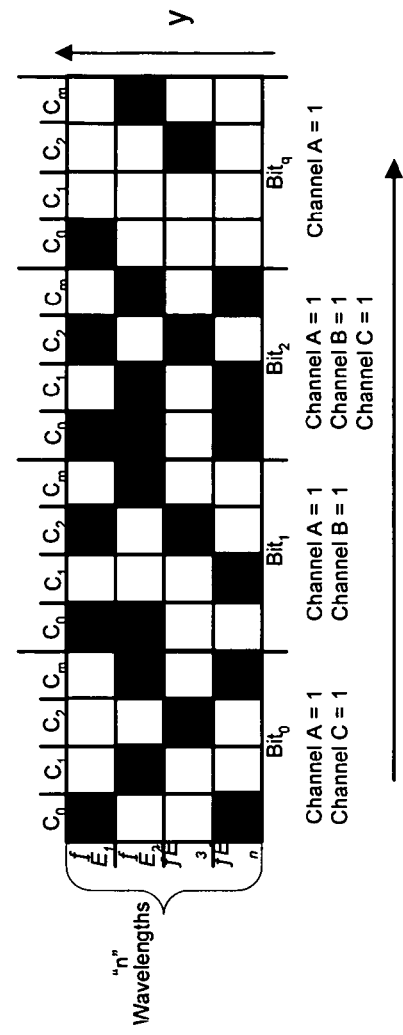

OPTICAL CODE DIVISION MULTIPLE ACCESS DATA STORAGE AND RETRIEVAL

CROSS REFERENCE TO RELATED APPLICATIONS

This patent application is related to U.S. Non Provisional patent application Ser. No. 11/317,135 that is entitled "Dynamic Temporal Duration Optical Transmission Privacy", that was filed Dec. 23, 2005 and the entire contents of which are incorporated by reference herein.

FIELD OF THE INVENTION

The present invention generally relates to the field of storing and retrieving data through an optical network and, more particularly, to storing data from optical data channels of an Optical Code Division Multiple Access (OCDMA) signal to data storage volumes such that the OCDMA signaling and formatting information are retained during storage and regenerated during retrieval.

BACKGROUND OF THE INVENTION

Optical networks use optical signaling and formatting techniques, such as OCDMA, to support multiple data channels over a single fiber optic cable. The optical communications thereof are typically implemented by transmitting data through fiber-optic links because light is less prone to optical dispersion through fiber-optic links as opposed to other mediums, such as air. These optical communications use light to convey data to an intended receiver through the fiber-optic link, through "on-off keying" of the wavelength. For example, a binary signal (i.e., a signal of logical 1's and logical 0's) is transmitted through a fiber-optic link with the light switching on and off.

Demand on communications has dictated that optical fiber be shared among users. In this regard, a single optical fiber is often shared by multiple binary signals. One method of sharing involves assigning specific time periods to individual users and is called Time Division Multiplexing ("TDM"). During a period of time in TDM, a single user transmits data and other users wait for their time period. Another method of sharing involves assigning specific wavelengths of light to individual users and is called Wavelength Division Multiplexing ("WDM"). In WDM, each user has a specific wavelength of light and may transmit data on that wavelength at any time, but no other user may use that wavelength. Optical Code Division Multiple Access ("OCDMA") is yet another method to share the optical fiber among a number of users. In OCDMA, each user is assigned a unique code that is composed of temporal and wavelength components. This unique OCDMA signature may be thought of as a unique identifier or thumbprint on a data stream. For a user to receive a data stream, the user must detect a data stream having an appropriate OCDMA signature.

To store such optical network communications, the data therein is typically decoded and converted to electronic data and stored in a storage element using a conventional disk block format. The optical to electronic conversion results in the removal of the original optical signaling and formatting information used to transfer the data over the network.

SUMMARY OF THE INVENTION

The systems and methods presented herein allow for OCDMA formatting information to be stored in a storage unit along with the user data. In this regard, the OCDMA formatting may be regenerated upon data retrieval. In one embodiment of the invention, the OCDMA signaling employs a two-dimensional coding technique allowing individual channels of optical data and protection of the data while resident on the data storage system.

In a first aspect, an OCDMA storage system includes an optical communications source comprising one or more OCDMA encoders and an optical coupler optically interconnected to the one or more OCDMA encoders, as well as a wavelength demultiplexer optically interconnected with the optical communications source via the optical coupler. The OCDMA storage system also includes a plurality of light detectors. Each of the light detectors is optically interconnected with the wavelength demultiplexer and is associated with a unique wavelength of light. Additionally, the OCDMA storage system includes a storage volume unit comprising a plurality of storage volumes with each light detector being uniquely associated with a respective storage volume.

The OCDMA storage system may include a fiber optic communication link between the demultiplexer and the optical coupler. Additionally, the optical communications source may include a plurality of optical data streams, wherein each optical data stream includes a plurality of data elements and where each data element is associated with a particular wavelength. In such as case, the data elements corresponding with the same first wavelength from the plurality of optical data streams are stored in a first storage volume of the plurality of storage volumes and the data elements corresponding with the same second wavelength from the plurality of optical data streams are stored in a second storage volume of the plurality of storage volumes.

In a second aspect, a method of storing data in a plurality of storage volumes includes the steps of demultiplexing an Optical Code Division Multiple Access ("OCDMA") signal into a plurality of optical data streams and associating each optical data stream with its own storage volume. Each optical data stream is wavelength specific.

The method may include a step of converting each optical data stream to a respective electronic data stream. For example, the step of converting each optical data stream may include a step of detecting each received wavelength of light. In this regard, the method may further include a step of storing each electronic data stream with a wavelength specific storage volume.

The method may further include a step of receiving the OCDMA signal from an optical network. The OCDMA signal may include a plurality of data elements wherein each data element is associated with a particular wavelength for a particular optical data stream. The data elements corresponding with the same first wavelength from the OCDMA signal may be stored in a first storage volume of the plurality of storage volumes and the data elements corresponding with the same second wavelength from the OCDMA signal may be stored in a second storage volume of the plurality of storage volumes.

In a third aspect, an OCDMA data retrieval system includes a plurality of light generators, wherein each light generator is associated with a unique wavelength of light. The OCDMA data retrieval system also includes a plurality of storage volumes communicatively coupled to the plurality of light generators. In this regard, each light generator is uniquely associated with one of the storage volumes.

A multiplexer optically interconnects with the light generators. The multiplexer may be optically interconnected with an optical network and configured for transferring a multiplexed OCDMA signal to the optical network. The multiplexed OCDMA signal may include a plurality of data elements, wherein each data element is associated with a particular wavelength. In this regard, the data elements corresponding with the same first wavelength from the multiplexed OCDMA signal are retrieved from a first storage volume of the plurality of storage volumes. Additionally, the data elements corresponding with the same second wavelength from the multiplexed OCDMA signal are retrieved from a second storage volume of the plurality of storage volumes. The OCDMA data retrieval system may also include a fiber-optic link between the plurality of light generators and the multiplexer.

In a fourth aspect, a method of retrieving OCDMA data from a storage element communicatively coupled to an optical network includes retrieving OCDMA data from a plurality of storage volumes of the storage element and converting retrieved OCDMA data to light using a plurality of light generators. Each light generator is communicatively coupled to a corresponding one of the plurality of storage volumes and each storage volume maintains data associated with one wavelength of light.

The method may include a step of multiplexing a plurality of wavelengths of light into an OCDMA signal in response to converting retrieved OCDMA data. Additionally, the method may include a step of transferring the OCDMA signal to the optical network. In this regard, the method may further include a step of performing an OCDMA conversion of the OCDMA signal to extract data channels.

The OCDMA signal includes a plurality of data elements. In this regard, each data element is associated with a particular wavelength for a particular optical data stream. Additionally, the data elements corresponding with the same first wavelength from the OCDMA signal are retrieved from a first storage volume of the plurality of storage volumes and the data elements corresponding with the same second wavelength from the OCDMA signal are retrieved from a second storage volume of the plurality of storage volumes.

BRIEF DESCRIPTION OF THE INVENTION AND THE SEVERAL VIEWS OF THE DRAWINGS

FIG. 3 is a diagram of an exemplary OCDMA signature code.

FIG. 4 is a diagram of another exemplary OCDMA signature code.

FIG. 5 is a diagram of another exemplary OCDMA signature code.

FIG. 6 is a diagram of an optical data stream using the OCDMA signature codes of FIGS. 3-5.

DETAILED DESCRIPTION OF THE INVENTION

Figure 1:
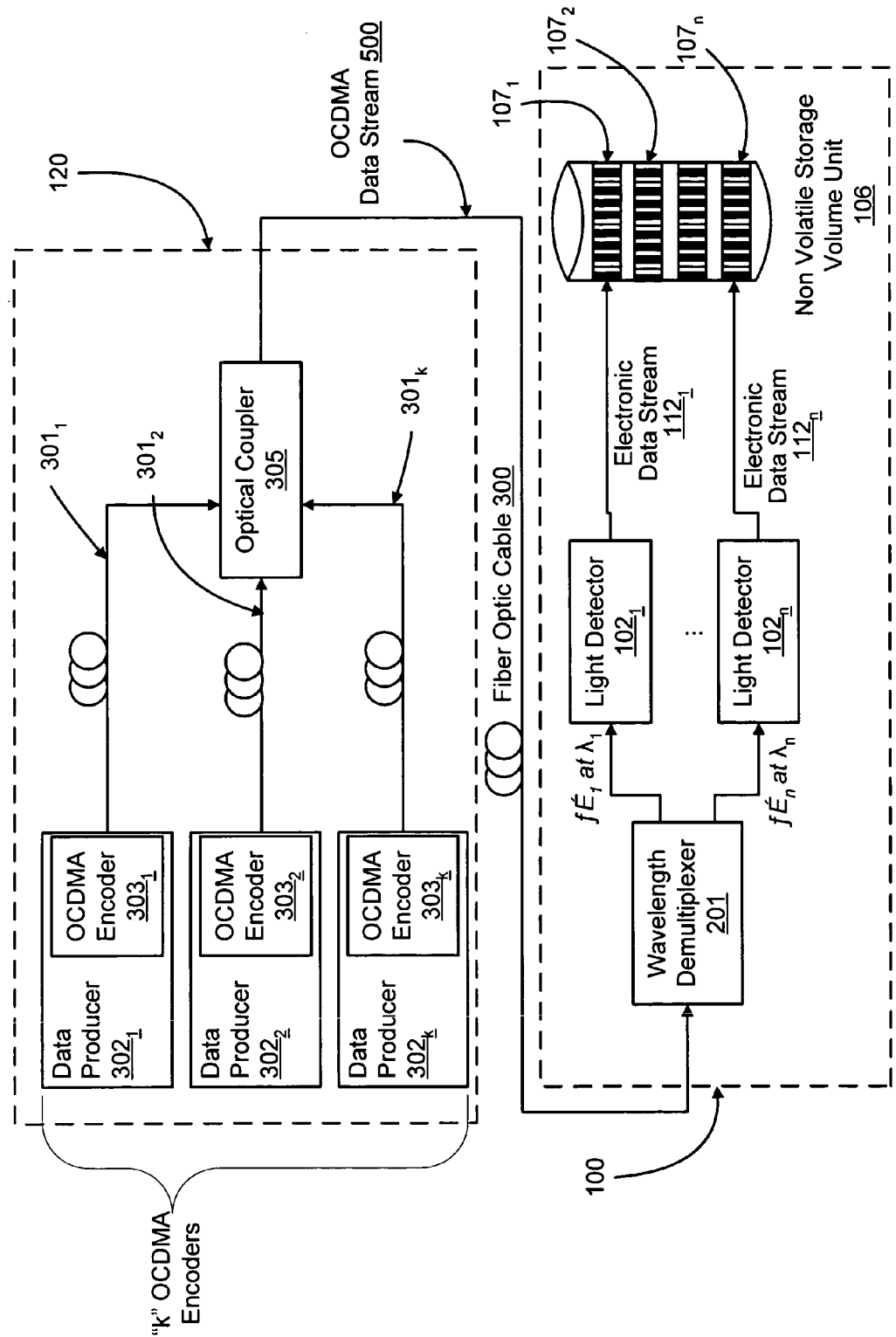
FIG. 1 is a block diagram of an exemplary system for storing OCDMA data.

FIG. 1 is a block diagram of system 100 that stores OCDMA data. In this embodiment, system 100 includes wavelength demultiplexer 201, a plurality of light detectors $102_{1\ldots n}$ (wherein n is an integer greater than 1), and nonvolatile storage volume unit 106. System 100 is optically coupled to optical network 120 via fiber-optic cable 300. More specifically, system 100 is optically coupled to optical coupler 305 via fiber-optic cable 300 to store data from a plurality of data producers $302_{1\ldots k}$ (wherein k is an integer greater than 1). Examples of storage volume unit 106 include rotating disk drives and flash memory cards, each having a plurality of logical partitions (i.e., storage volumes $107_{1\ldots n}$).

Each data producer 302 is generally an electronic device capable of electronically generating data. For example, each data producer 302 may be an embedded computer system executing a software algorithm. In this regard, each data producer 302 may require that its output be stored to nonvolatile storage volume unit 106. As shown herein, each data producer 302 includes a corresponding OCDMA encoder 303 (e.g., data producer $302_1$ includes OCDMA encoder $303_1$, data producer $302_2$ includes OCDMA encoder $303_2$, etc.). However, data producers $302_{1\ldots k}$ may each host multiple OCDMA encoder 303 units.

Each OCDMA encoder 303 converts the electronically generated data from its corresponding data producer 302 into an optical format (i.e., an OCDMA signal, such as OCDMA data stream 500 of FIG. 6). In this regard, OCDMA encoder 303 is generally programmed with a unique OCDMA signature code that determines the spread sequence for a given data channel (e.g., channel "A" OCDMA signature code 505 of FIG. 3). This inherent signature code aspect of OCDMA allows for data privacy while the data resides on storage volume unit 106. Timing information of the OCDMA signature codes may also be stored with storage volume unit 106, for reasons explained below.

The maximum number k of OCDMA encoders 303 allowed for a given implementation of system 100 depends on the maximum number n of OCDMA signature codes supported by the OCDMA coding technique. Those skilled in the art are readily familiar with various OCDMA coding techniques.

Optical coupler 305 is the common collection point for OCDMA encoders $303_{1\ldots k}$. Point-to-point fiber optic cable 301 optically connects a corresponding OCDMA encoder 303 to optical coupler 305 (e.g., point-to-point fiber optic cable $301_1$ optically connects OCDMA encoder $303_1$ to optical coupler 305, point-to-point fiber optic cable $301_2$ optically connects OCDMA encoder $303_2$ to optical coupler 305, etc.). Optical coupler 305 combines optical signals from the OCDMA encoders $303_{1\ldots k}$ and generates a single OCDMA data stream 500.

A wavelength demultiplexer 201 is configured for receiving OCDMA data stream 500 from a fiber optic network. For example, wavelength demultiplexer 201 may couple to optical coupler 305 via fiber-optic cable 300 to receive OCDMA data stream 500. Upon receiving OCDMA data stream 500, wavelength demultiplexer 201 may separate OCDMA data stream 500 into its individual wavelengths of light $\lambda_{1\ldots n}$. Wavelength demultiplexers, such as wavelength demultiplexer 201, are readily understood devices by those skilled in the art.

Once demultiplexed, each wavelength of light $\lambda$ is transferred to a corresponding light detector 102. For example, wavelength demultiplexer 201 may optically couple to each light detector 102 to transfer an individual wavelength of light $\lambda$ to each light detector 102. In this regard, each light detector 102 may receive an optical data stream associated with the assigned wavelength of light $\lambda$. That is, each light detector 102 may receive a portion (labeled $fE_{1\ldots n}$) of OCDMA data stream 500 that corresponds to a single wavelength of light $\lambda$. Each light detector 102 may subsequently convert the optical data fE from its assigned wavelength of light to a corresponding electronic data stream 112. Generally, the maximum number n of wavelengths of light $\lambda$ for a given implementation of system 100 depends on the OCDMA coding scheme employed. That is, the OCDMA coding scheme may have an established number of wavelengths of light that determines the number of light detectors 102 to be used with system 100. The number n of wavelengths of light λ are exemplarily shown on the y-axis of OCDMA data stream 500 in FIG. 6.

Upon conversion of the optical data f $E_{1...n}$ to electronic data streams $112_{1...n}$, each electronic data stream 112 is transferred to a corresponding storage volume 107 within storage volume unit 106 (e.g., electronic data stream $112_1$ is stored with storage volume $107_1$, electronic data stream $112_2$ is stored with storage volume $107_2$, etc.). Timing information, as mentioned above, of a particular electronic data stream 112 is also stored with the corresponding storage volume 107. For example, data for a particular channel within OCDMA data stream 500 may be dispersed across a plurality of wavelengths. As such, each electronic data stream 112, being stored according to wavelength, may use timing information of the other electronic data streams such that data may be retrieved from storage volume unit 106 at a later date. That is, the timing information is used to extract the electronic data streams 112 from the storage volumes 107 in a manner that replicates the original OCDMA signal such that the individual data channels may thereafter be extracted therefrom.

Data privacy is achieved with such storage since the electronic data streams $112_{1...n}$ are stored in raw format according to wavelengths of light $λ_{1...n}$ (i.e., electronic data streams $112_{1...n}$ are respectively stored with corresponding storage volumes $107_{1...n}$ without OCDMA decode conversion). Accordingly, the retrieval of data generally requires knowledge of the same OCDMA signature codes used during the encoding process. Generally, the disk block structure employed by the storage volume unit 106 is application dependent (e.g., Redundant Array of Independent Disk—"RAID"—storage systems, Non Volatile Random Access Memory—"NVRAM").

Figure 2:
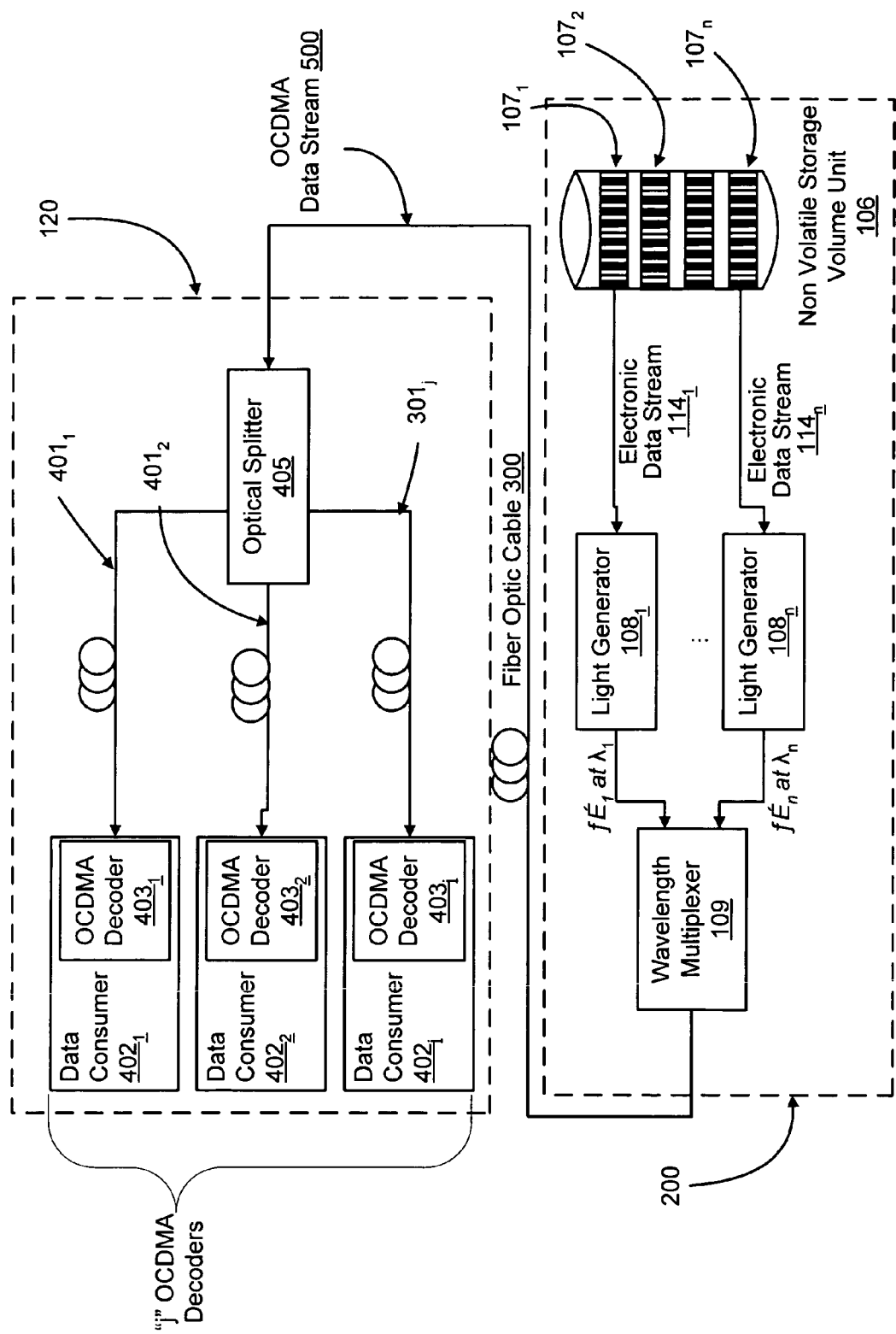
FIG. 2 is a block diagram of an exemplary system for retrieving OCDMA data.

FIG. 2 is a block diagram of exemplary system 200 for retrieving OCDMA data. System 200 includes wavelength multiplexer 109, light generators $108_{1...n}$ and storage volume unit 106 discussed above, which further includes storage volumes $107_{1...n}$. Wavelength multiplexer 109 is configured for multiplexing the individual wavelengths of light generated by light generators $108_{1...n}$. In this regard, wavelength multiplexer 109 may reconstruct OCDMA data stream 500 for access by data consumers $402_{1...j}$ (where j is an integer greater than 1). Generally, data consumers $402_{1...j}$ may be any electronic devices capable of retrieving stored data. For example, a data consumer 402 may be an embedded computer system executing a software algorithm. In this regard, each data consumer 402 may require that its input be retrieved from nonvolatile storage volume unit 106.

Each of electronic data streams $114_{1...n}$ are retrieved from storage volume unit 106 via corresponding light generators $108_{1...n}$. For example, electronic data streams $114_{1...n}$ are each associated with wavelengths of light $λ_{1...n}$. In this regard, the OCDMA signature codes of OCDMA data stream 500 may not be required to decode the data. Rather, light generators $108_{1...n}$ may retrieve electronic data streams $114_{1...n}$ from associated storage volumes $107_{1...n}$ based on wavelengths of light for direct conversion to corresponding optical data f $E_{1...n}$, when directed by data consumers $402_{1...n}$. In this regard, each electronic data stream 114 may have timing information configured therewith such that electronic data streams $114_{1...n}$ may be synchronously retrieved from storage volumes $107_{1...n}$. Such may allow for OCDMA data stream 500 to be reconstructed to its form prior to storage. Again, since electronic data streams $114_{1...n}$ maintain data according to wavelengths of light $λ_{1...n}$, a certain level of data privacy is generally assured.

Each light generator 108 receives an electronic data stream 114 and converts it into an optical data stream f E for the assigned wavelength of light λ (e.g., light generator $108_1$ may convert electronic data stream $114_1$ to optical data f $E_1$, light generator $108_2$ may convert electronic data stream $114_2$ to optical data f $E_2$, etc.). As similarly described hereinabove, the maximum number n of wavelengths of light λ for a given implementation of system 200 generally depends on the OCDMA coding scheme employed. Again, the number n of wavelengths of light λ are shown on the y-axis of OCDMA data stream 500 in FIG. 6.

Upon conversion of electronic data streams $114_{1...n}$ to optical data streams f $E_{1...n}$, wavelength multiplexer 109 multiplexes the individual wavelengths of light $λ_{1...n}$ generated by light generators $108_{1...n}$. In this regard, wavelength multiplexer 109 reconstructs the OCDMA data stream 500 for access by data consumers $402_{1...n}$. For example, since the OCDMA coding scheme is retained with storage volume unit 106, wavelength multiplexer 109 may multiplex the generated individual wavelengths of light $λ_{1...n}$ and thereby reconstruct the OCDMA data stream 500 for access by data consumers $402_{1...n}$. As such, wavelength multiplexer 109 may couple to optical network 120 via fiber-optic cable 300 for access by data consumers $402_{1...n}$. More specifically, wavelength multiplexer 109 may couple to optical splitter 405 via fiber-optic cable 300 for access by data consumers $402_{1...n}$.

Similar to data producers $302_{1...k}$ and their corresponding OCDMA encoders $303_{1...k}$ of FIG. 1, each data consumer 402 includes a corresponding OCDMA decoder 403 (e.g., data consumer $402_1$ includes OCDMA decoder $403_1$, data consumer $402_2$ includes OCDMA decoder $403_2$, etc.). OCDMA decoders 403 are used to extract data from OCDMA data stream 500. As stated above, knowledge of the OCDMA signature code is generally required by OCDMA decoders 403 to decode data within OCDMA data stream 500.

Each OCDMA decoder 403 converts the optical data signal produced by optical splitter 405 into electrically formatted data available to the data consumer 402. For example, optical splitter 405 "splits" OCDMA data stream 500 into individual optical streams with one optical stream per OCDMA decoder 403 (i.e., each OCDMA decoder 403 receives all data of OCDMA data stream 500, generally in equal portions of the overall optical intensity of OCDMA data stream 500). Point-to-point fiber optic cables 401 optically connect optical splitter 405 to each OCDMA decoder 403 (e.g., point-to-point fiber optic cable $401_1$ optically connects optical splitter 405 to OCDMA decoder $403_1$, point-to-point fiber optic cable $401_2$ optically connects optical splitter 405 to OCDMA decoder $403_2$, etc.). With the OCDMA decoders 403 optically interconnected with optical splitter 405, each data consumer 402 may thereby extract data from OCDMA data stream 500 via OCDMA decoder 403. Similar to system 100 of FIG. 1, the maximum number j of OCDMA decoders 403 for a given implementation of system 200 depends on the OCDMA signature codes used.

Although each data consumer 402 is shown as being configured with a single corresponding OCDMA decoder 403, data consumers $402_{1...j}$ may each host multiple OCDMA decoder 403 units. Additionally, multiple OCDMA decoders 403 may be programmed with the same OCDMA signature code.

The optical format of optical data stream 500 used with systems 100 and 200 are now described herein. Specifically, FIGS. 3, 4, and 5 are diagrams of exemplary OCDMA signature codes 505, 506, and 507, whereas FIG. 6 is a diagram of optical data stream 500 using the OCDMA signature codes 505, 506, and 507. In this regard, OCDMA signature codes 505, 506, and 507 illustrate how OCDMA data stream 500 may be encoded and/or decoded.

Each OCDMA signature code is a 2-dimensional construct that uniquely identifies a data channel in an OCDMA network (e.g., OCDMA network 120). For example, OCDMA signature code 505 for a logical "1-bit" for Channel A is represented by spread pattern imposed on chips $C_0 \ldots C_m$ (wherein m is an integer greater than 1) and wavelengths $\lambda_{1 \ldots n}$ (i.e., optical data streams $fE_{1 \ldots n}$ associated at those wavelengths). OCDMA signature code 506 for a logical "1-bit" of Channel B differs from OCDMA signature code 505 of Channel A with respect to chip and wavelength spread. Similarly, Channel C's OCDMA signature code 507 differs from OCDMA signature codes 506 and 505 with respect to chip and wavelength spread. This "distance" in coding (i.e., differences in chip occupations) allows for channel separation such that only an OCDMA decoder 403 with knowledge of its proper OCDMA signature code can decode data from OCDMA data stream 500. For example, decoder $403_1$ may be designated as Channel A and therefore may have knowledge of OCDMA signature code 505. As such, decoder $403_1$ may use OCDMA signature code 505 to extract data from OCDMA data stream 500. Similarly, encoder $303_1$ may use OCDMA signature code 505 to encode data for coupling into OCDMA data stream 500 via optical coupler 305.

FIG. 6 depicts OCDMA data stream 500 with channels A, B, and C in a multiplexed fashion. For example, $bit_0$ depicts channels A and C as being active and containing a logical 1-bit, $bit_1$ depicts channels A and B as being active and containing a 1-bit, $bit_2$ depicts channels A, B, and C as being active with logical 1-bits, and $bit_q$ depicts channel A as being active and containing a logical 1-bit. $Bit_q$ is intended to illustrate OCDMA data stream 500 as having a plurality of bits (i.e., q is an integer greater than 1). With channels being defined within OCDMA data stream 500 by OCDMA signatures 505, 506, and 507, various forms of data may be transmitted via channels A, B, and C, respectively. For example, streaming video data from a camera output could be broadcast to several data consumers 402 and/or stored with storage volume unit 106 simultaneously via a designated channel (e.g., channels A, B, and/or C).

OCDMA data stream 500 also illustrates logical 0-bits interspersed with logical 1-bits. For example, when a logical 0-bit from a particular channel (e.g., channels A, B, or C) is transmitted via optical data stream 500, the bit comprises logical 0's (e.g., no light transmission) at all chips for that channel. However, those skilled in the art should readily recognize that the invention is not intended to be limited to logical 0-bits that include no light transmission for all chip/wavelength combinations for a particular bit. Rather, other embodiments may configure logical 0-bits with a particular code, such as described with respect to the logical 1-bits.

Additionally, those skilled in the art should readily recognize that OCDMA data stream 500 may in fact be a continuous data stream populated by more or less channels than those shown herein. For example, the maximum number n of wavelengths $\lambda$ (y-axis) and the number of chips $C0 \ldots m$ per bit for a given implementation typically depends on the OCDMA coding scheme employed. As such, the chip/wavelength spread of a particular OCDMA coding scheme may dictate the number of wavelengths and chips per bit for a given OCDMA storage system and/or a given OCDMA retrieval system (e.g., system 100 and system 200, respectively).

While the above embodiments have been shown and described in sufficient detail so as to enable one skilled in the art to make and use the invention, the invention is not intended to be limited to these embodiments. Those skilled in the art should readily recognize that certain features may be implemented in different ways. For example, certain steps may be implemented optically and/or electronically (e.g., such as with optoelectronic components). Additionally, such features may be controlled via firmware and/or software. Those skilled in the art are readily familiar with optoelectronics, software and firmware.

The foregoing description of the present invention has been presented for purposes of illustration and description. Furthermore, the description is not intended to limit the invention to form disclosed herein. Consequently, variations and modifications commensurate with the above teachings, and skill and knowledge of the relevant art, are within the scope of the present invention. The embodiments described hereinabove are further intended to explain best modes known as practicing the invention and to enable others skilled in the art to utilize the invention in such or other embodiments with various modifications required by the particular application(s) or use(s) of the present invention. It is intended that the appended claims, therefore, be construed to include alternative embodiments to the extent permitted by the prior art.

What is claimed is:

1. An Optical Code Division Multiple Access ("OCDMA") storage system, comprising:
    an optical communications source comprising one or more OCDMA encoders and an optical coupler optically interconnected to said one or more OCDMA encoders;
    a wavelength demultiplexer optically interconnected with said optical communications source via said optical coupler;
    a plurality of light detectors, wherein each of said plurality of light detectors is optically interconnected with said wavelength demultiplexer and associated with a unique wavelength of light; and
    a storage volume unit comprising a plurality of storage volumes, wherein each of said plurality of light detectors is uniquely associated with a respective one of said plurality of storage volumes;
    wherein said optical communications source comprises a plurality of optical data streams, wherein each said optical data stream comprises a plurality of data elements, wherein each said data element is associated with a particular wavelength, wherein said data elements corresponding with the same first wavelength from different ones of said plurality of optical data streams are stored in a first storage volume of said plurality of storage volumes, and wherein said data elements corresponding with the same second wavelength from different ones of said plurality of optical streams are stored in a second storage volume of said plurality of storage volumes.

2. The OCDMA storage system of claim 1, further comprising a fiber optic communication link between said demultiplexer and said optical coupler.

3. The OCDMA storage system of claim 1, wherein said plurality of storage volumes store said plurality of data elements such that said plurality of optical data streams are reproducible from said stored plurality of data elements.

4. The OCDMA storage system of claim 1, wherein each of said plurality of storage volumes is a non volatile storage volume.

5. The OCDMA storage system of claim 4, wherein said plurality of storage volumes are logical partitions of said storage volume unit.

6. The OCDMA storage system of claim 4, wherein said storage volume unit comprises at least one of a rotating disk drive and flash memory.

7. A method of storing data in a plurality of storage volumes, comprising steps of:
- demultiplexing an Optical Code Division Multiple Access ("OCDMA") signal into a plurality of optical data streams, wherein each optical data stream is wavelength specific; and
- associating each said optical data stream with its own storage volume;
- converting each said optical data stream to a respective electronic data stream; and
- storing each said electronic data stream with a wavelength specific wavelength-specific non volatile storage volume; and
- wherein said OCDMA signal comprises a plurality of data elements, wherein each said data element is associated with a particular wavelength for a particular optical data stream, wherein said data elements corresponding with the same first wavelength from said OCDMA signal are stored in a first storage volume of said plurality of storage volumes, and wherein said data elements corresponding with the same second wavelength from said OCDMA signal are stored in a second storage volume of said plurality of storage volumes.

8. The method of claim 7, wherein said step of converting each said optical data stream comprises a step of detecting each received wavelength of light.

9. The method of claim 7, further comprising a step of receiving said OCDMA signal from an optical network.

10. The method of claim 7, wherein said associating step comprises creating stored data, wherein said method further comprises reproducing said OCDMA signal from said stored data.

11. The method of claim 7, further comprising:
- maintaining storage of said stored data in said storage volume unit; and
- reproducing said OCDMA signal from said stored data in said storage volume unit,
- wherein said maintaining step is performed after said demultiplexing step, said associating step, said converting step, and said storing step are completed, and
- wherein said reproducing step is performed after said maintaining step.

12. The method of claim 11, wherein said maintaining step is performed such that said stored data represents an entirety of said OCDMA signal.

13. The method of claim 11, wherein decoding of said OCDMA signal does not occur between said demultiplexing and reproducing steps.

14. The method of claim 11, wherein said maintaining step is performed such that said OCDMA signal may be separately stored and retrieved.

* * * * *